J. S. FRITZ.
TIRE PATCH.
APPLICATION FILED FEB. 7, 1921.
1,419,453.
Patented June 13, 1922.
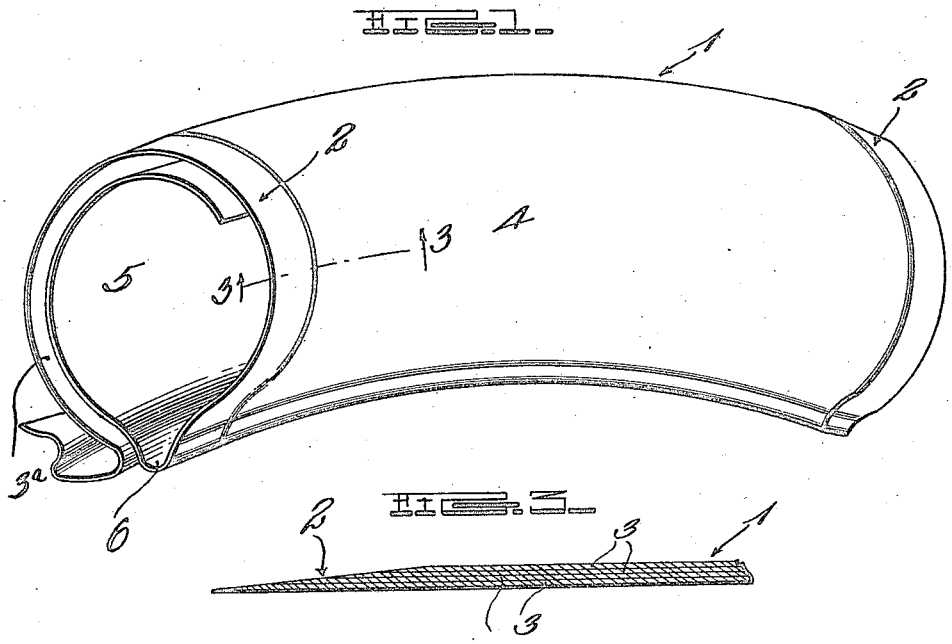
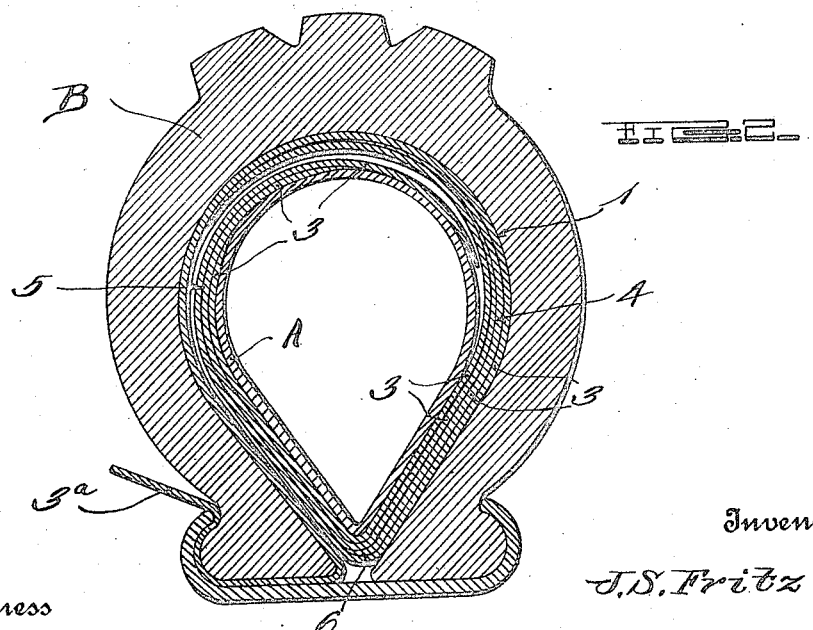
Inventor
J. S. Fritz

UNITED STATES PATENT OFFICE.

JACOB S. FRITZ, OF ZANESVILLE, OHIO.

TIRE PATCH.

1,419,453.  Specification of Letters Patent.  Patented June 13, 1922.

Application filed February 7, 1921. Serial No. 443,091.

*To all whom it may concern:*

Be it known that I, JACOB S. FRITZ, a citizen of the United States, residing at Zanesville, in the county of Muskingum and State of Ohio, have invented certain new and useful Improvements in Tire Patches; and I do declare the following to be a full, clear, and exact description of the invention, such as will enable others skilled in the art to which it appertains to make and use the same.

This invention relates to an improved tire patch of the type adapted for disposition between the inner tube and the outer casing, the same having for its principal object to provide a patch which will effectively serve to cover rim cuts, blow-outs or other breaks at any point in the transverse circumference of the casing. In other words, the patch will effectively cover breaks whether they are in the side walls of the casing, tread, or at the joining point of the beads with the body portion of the casing.

Another and important object of the invention is to provide a tire patch which is in the form of a split tubular sleeve which is adapted to entirely surround a predetermined portion of the inner tube, this sleeve being comparatively thick and of uniform thickness so as to not only effectively cover the break in the casing, but so as to reinforce a separated bead so that the tire will hold on the rim as not otherwise possible when a cut occurs at the adjoining point of the beads with the body of the casing.

A further object of the invention is to provide a patch in the form of a sleeve, the same being made up of a plurality of plies of superimposed rubbered fabric and one of the plies of one of the side walls being extended beyond the other plies and not only serving as an anchoring flap to prevent displacement of the patch but rendering the two walls of the sleeve of uniform thickness, which is not the case before the flap is placed between the tire and rim.

A further object of the invention is to provide a patch of this type which embodies a substantially stiff external rib for disposition between the beads of the casing for effectively forcing the latter to effective engagement with the rim flanges and at the same time serving to prevent pinching of the inner tube between these beads as oftentimes occurs.

A still further object of the invention is to generally improve similar patches by the provision of one of extreme simplicity and durability which can be placed in position in the casing by inexperienced hands, one which is self-adjustable so that it can be used on various sizes of tires, and one which has its opposite ends so constructed that two or more of said patches may be telescopically connected for covering a comparatively long slit in the casing.

Other objects and advantages of the invention will be apparent during the course of the following description.

In the accompanying drawing forming a part of this specification and in which like numerals are employed to designate like parts throughout the same:

Figure 1 is a perspective view of a tire patch constructed in accordance with this invention.

Figure 2 is a transverse section through a partially inflated tire equipped with one of these patches.

Figure 3 is a sectional view through the patch taken on the plane of the line 3—3 of Fig. 1.

Referring to the drawing by numerals, 1 designates the patch as before stated, in the form of a sleeve which is designed to entirely surround a predetermined portion of the inner tube A so as to cover a break in the casing B whether in the side walls, tread, or at the juncture of the beads and the body portion of the casing. At this point, I wish to direct attention to the fact that the patch at its opposite end is bevelled as indicated at 2 and this particular construction permits two or more of the patches to be telescopically connected in order to permit the patches to cover a relatively long split in the tire casing. As before stated, the patch is made up of a plurality of superimposed layers of rubbered fabric 3 and these layers are so connected with one another that the right-hand wall 4 of the patch is normally of a greater thickness than the remaining side wall 5. However, since one of the layers $3^a$ is extended beyond the remaining layers as shown in Fig. 1, this extended layer can be wrapped about the outer layer of the wall 5 so as to give this wall the same thickness as the wall 4. The free end of this extended layer $3^a$ is designed to be passed between the left-hand bead of the casing and the rim in the manner disclosed in Fig. 2, and it thus serves the additional function of an anchoring flap and serves to prevent accidental displacement of the patch. Since the side walls 4 and 5 of the sleeve are separate from one another, it will be seen that when they are overlapped, the tread portion of the patch is formed and the sleeve is rendered uniform in thickness except at its opposite end where it is beveled as indicated at 2. At this point, I may state that in order to render the patch of uniform thickness as stated, the layers of fabric are so connected with one another that the free end of the side wall 5 is brought to a gradual taper and the intermediate portion of the wall 4 which overlaps this end of the wall 5 is likewise tapered. At a point diametrically opposite the overlapping portions of the side walls of the sleeve, I provide a longitudinally externally disposed relatively stiff rib 6 which, when the patch is in use, extends between the beads of the casing and serves to force the latter into tight engagement with the rim flanges and at the same time serves to receive the inner tube in its channeled inner face so as to prevent pinching of the tube between the beads as sometimes occurs. By forming the sleeve with a plurality of layers of fabric, it not only serves to effectively cover the blow-out or rim-cut, but a sufficient thickness is given to it to render it comparatively stiff, so that when the inner tube is inflated, it serves to reinforce the beads and at the same time to cover the rim-cut. Thus, the tire cannot become easily separated from the rim as would otherwise be the case. It is to be noted that the split of the sleeve is disposed adjacent the tread of the casing, that is, directly beneath the tread, and the more rigid part thereof is disposed between the beads of the casing for the purpose already set forth. As the walls of the sleeve are separated, it will be seen that the patch is rendered self-adjustable and can be effectively used in various sizes of tires. Furthermore, since the ends of layers of fabric bearing on the inner tube are covered with rubber, the entire interior surface of the patch is rendered smooth and injury to the tube is thus prevented.

In use, the patch is placed between the inner tube and casing so as to cover the rim-cut or blow-out. In placing the patch in position, the free end of the anchoring flap 3ª is grasped and drawn around the outermost layer of the left-hand side wall 5, so as to render the two side walls of the same thickness. In so doing, the end of this side wall and the remaining side wall are caused to overlap one another. The tube is then placed within the casing in the usual way and the anchoring flap placed between one of the beads of the casing and the rim in the manner shown in Fig. 2, care being taken that the rib 6 is positioned between the two beads for the purpose described. When the inner tube is inflated, the free end of the wall 5 will ride against the inner layer of fabric of the wall 4 and the patch will thus adjust itself to the casing. Because of this construction, the patch may be effectively used in connection with tires of various sizes. With the patch in position, it will be seen that even though the bead is partially separated from the body of the casing by a rim-cut, it will be sufficiently reinforced to temporarily retain the tire in the proper position on the rim. Ordinarily a rim cut so weakens the beads that it is practically impossible to prevent accidental displacement of the tire from the rim.

From the foregoing description, it will be seen that I have devised an extremely efficient and desirable tire patch which is of such a construction that it will effectively cover blow-outs, rim-cuts, or other breaks at practically any point in the transverse circumference of the tire casing. The patch is such a thickness, that it not only effectively protects the inner tube, but it is rendered sufficiently stiff to serve as novel reinforcing means for the beads of the casing in case the latter are separated from the body portion by rim-cuts. It may be well to again direct attention to the fact that this result is brought about by equipping the patch with the substantially V-shaped external rib which, when the inner tube is inflated, tends to force the tire beads into effective engagement with the rim flanges. Ordinarily, the overlapping ends of many of the patches join at the point where the rib 6 is positioned, and of course, do not reinforce or tend to force the beads apart in the manner that my patch does. I contemplate so placing the patch on the inner tube that the over-lapping portions are directly beneath the tread of the casing. Thus, the more rigid portion of the latch is positioned so that it will effectively reinforce a separated or weak bead and at the same time cover the rim-cut. I may also state at this point, that patches now marketed are of insufficient thickness to effectively cover rim-cuts. These and other advantages and features of the invention have, no doubt, become apparent from the foregoing description and drawing.

Persons skilled in the art to which the invention relates will doubtless be able to obtain a clear understanding of the same by a careful consideration of the description taken in connection with the drawing. Therefore, a more detailed and lengthy description is thought unnecessary.

Since probably the best results may be obtained with the construction herein shown and described, this construction and arrangement is taken as the preferred embodiment of the invention. However, I wish it to be understood that slight minor changes in the shape, size, and arrangement may be resorted to without departing from the spirit of the invention or the scope of the subjoined claims.

I claim:

1. A combined blow-out and rim-cut patch for disposition between the casing and inner tube of an automobile tire comprising a tubular split sleeve for surrounding the inner tube and covering the break in the casing, said sleeve being made up of a plurality of superimposed layers of rubbered fabric and the side walls thereof being arranged in overlapping relation to form the tread portion and one of the fabric layers of one of the side walls being adapted to be wrapped against the other side wall and then extended between one of the beads of the casing and rim to retain the sleeve in place.

2. The structure set forth in claim 1, the last named side wall of the sleeve being of less thickness than the other one but being made the same in thickness when said extended layer of fabric is wrapped against it.

3. A combined blow-out and rim-cut patch for disposition between the casing and inner tube of an automobile tire comprising a tubular split sleeve for surrounding the inner tube and covering the break in the casing, said sleeve being made up of a plurality of superimposed layers of rubbered fabric, and the side walls thereof being of different thickness and having bevelled portions arranged in overlapping relation to form the tread portion, one of the fabric layers of the thickest side wall being extended beyond the other layers and being intended to be wrapped against the thinner wall to make the two walls of substantially the same thickness, the free end of said one layer to be passed between the casing bead and rim to retain the sleeve in the proper place, and there being an external anchoring rib at the juncture of the two walls adapted for disposition between the beads of the casing to assist in retaining the sleeve in position.

In testimony whereof I have hereunto set my hand.

JACOB S. FRITZ.